Patented Mar. 23, 1926.

1,578,052

UNITED STATES PATENT OFFICE.

ALMER M. McAFEE, OF PORT ARTHUR, TEXAS, ASSIGNOR TO GULF REFINING COMPANY, OF PITTSBURGH, PENNSYLVANIA, A CORPORATION OF TEXAS.

METHOD OF MAKING ALUMINUM CHLORIDE.

No Drawing.   Application filed March 1, 1923.   Serial No. 622,213.

*To all whom it may concern:*

Be it known that I, ALMER M. McAFEE, a citizen of the United States, residing at Port Arthur, in the county of Jefferson and State of Texas, have invented certain new and useful Improvements in Methods of Making Aluminum Chloride, of which the following is a specification.

This invention relates to methods of making aluminum chloride; and it comprises an improvement in methods of making aluminum chloride by the reaction of chlorin on alumina in the presence of reducing agents, such as carbon, wherein such reaction is accelerated by the presence of a certain amount of returned waste gases coming from the operation itself, the effluent mixture of gases and vapors coming from the reaction zone being cooled to condense aluminum chloride therefrom and a certain proportion of the residual gases being returned to the reaction chamber, with or without a preliminary reduction by carbon; all as more fully hereinafter set forth and as claimed.

In the manufacture of aluminum chloride by the reaction of chlorin upon a hot mixture of carbon and alumina (bauxite), the reaction is not, as it is often formulated, merely a simultaneous and conjoint action of carbon and of chlorin upon the alumina, the carbon taking the oxygen of the $Al_2O_3$ and the chlorin combining with the remaining Al. The actions involved are apparently of no very simple nature. I have noticed in practice that upon exposing a hot mixture of carbon and alumina to the action of chlorin, there is a pause or "period of induction" before any substantial formation of vapors of aluminum chlorid takes place. During this period of induction, it is useless to supply a free flow of chlorin, since it is not taken up. This period of induction I have found can be considerably shortened and the reaction thereby much accelerated by limiting the supply of chlorin at first, adding merely enough in beginning to displace the gases already present and waiting for a time before adding more, thereby permitting an accumulation of gaseous products of reaction before beginning the regular flow of chlorin. These products include the carbon oxids, CO and $CO_2$. With a hot mixture of bauxite and carbon in an atmosphere of chlorin, the production of aluminum chloride vapors and the absorption of chlorin by the reaction mixture go on after the period of induction with steadily increasing rapidity for a time; the acceleration seeming to be, at least in some measure, proportional to the increasing concentration of these gases in the atmosphere of the reaction chamber in spite of the concomitant decrease in the concentration of chlorin gas. The reaction seems to go forward with maximum rapidity when there is a relatively high ratio of carbon oxids to chlorin in the gases in, or supplied to, the reaction chamber.

For similar reasons, a copious supply of chlorin during the reaction, that is, an unduly rapid flow of chlorin which washes away these gaseous products of reaction, seems to retard formation of chloride, rather than accelerate it, as might have been expected on the well known principles of "mass action." And I have found that the period of induction can be further shortened and the progress of the reaction accelerated by the expedient of admixing with the chlorin a certain amount of gaseous oxids of carbon; either carbon monoxid, CO, or carbon dioxid, $CO_2$, or of both, or of gases containing the oxids. In so doing, the permissible speed of flow of chlorin into, and the production of aluminum chloride per hour in, a given apparatus can be considerably accelerated. In spite of the fact that the chlorin is somewhat diluted, its absorption by the reaction mixture is quicker.

In and of itself, the aluminum chloride forming reaction requires no great volume of heat, although a certain temperature must be maintained, being perhaps somewhat exothermic; and by such a speeding up of the reactivity of the chlorin, the capacity of the apparatus is considerably increased. As carbon oxids are produced in the reaction whereby $Al_2O_3$ is converted into $AlCl_3$, a simple way of securing the presence of these oxids in the reaction chamber is to return a portion of the tail or waste gases leaving the condensers used for recovering aluminum chloride from its vapors; the returned gases going into the reaction chamber with the chlorin. In one embodiment of my invention, therefore, I produce aluminum chloride vapors from hot carbon and alumina (bauxite) in a suitable reaction zone in the presence of chlorin in any of the usual ways, remove the vapors and gases produced, cool the mixture to condense out aluminum chloride and then return some proportion of the uncondensed gases from the condenser to the reaction zone in admixture, or simultaneously, with the chlorin set into such chamber. The returned gases may be, and usually are, heated prior to entering the reaction zone.

As the aluminum chloride making reaction is often stated, the carbon is converted into carbon monoxid, or CO, by the oxygen of the alumina, and does not form carbon dioxid, or $CO_2$. This is not correct. As a matter of fact, carbon monoxid is capable of reducing $Al_2O_3$ and producing $AlCl_3$ in the presence of chlorin, the CO becoming $CO_2$; and a successful method of manufacturing aluminum chloride (King & Roberts No. 1,308,080) is based on this fact. In this method, chlorin and hot producer gas are brought into reaction with bauxite, with the production of vapors of aluminum chloride and carbon dioxid. No carbon as such is necessarily used in the charge. In this method, the period of induction mentioned is considerably lessened. This method however is subject to the inconvenience that producer gas necessarily contains large amounts of diluting nitrogen. The air used in the producer is, of course, roughly, ⅘ths nitrogen. And I have found, with higher concentrations of carbon oxids than it is feasible to obtain in ordinary producer gas, the aluminum chloride reaction is accelerated and the subsequent condensation of aluminum chloride also becomes more convenient, by reason of the less dilution of its vapors by nitrogen. Such higher proportions can be obtained by a return of tail gases in a certain way.

In applying the present improvement to this method, the return of the tail gases to the reaction zone is indirect; such tail gases passing through a gas producer enroute to the reaction zone, whereby the contained carbon dioxid is reduced to a greater or less extent. By return of the tail gases from the operation to the gas producer, a producer gas is obtained less diluted with nitrogen and to that extent better for the King & Roberts reaction, and embodying the principle of the present invention of heightening the concentration of carbon oxids relative to chlorin in the aluminum chloride forming reaction. By a diminution in the amount of diluting nitrogen present, an increase in the carbon oxids concentration is obtained without a corresponding decrease in the amount of chlorin present. The active concentration of carbon oxids, including carbon monoxid, is considerably increased. By a continuance of the return of the tail gases to the producer, the nitrogen content of the gases used for return can be considerably lessened. If the producer be operated on the "blow and run" principle, that is, first blown up with air to cause an accumulation of heat in carbon at high temperature and is then run with tail gases from the operation, the gas formed in running being sent to the reaction chamber, the proportion of nitrogen present in such gas can be kept down to a low point and the amounts of carbon oxids present with the chlorin concomitantly increased. For reasons readily appearing, while it is advantageous to dilute the chlorin somewhat with carbon oxids, aside from utilizing the reducing power of CO, it is not advantageous in any way to increase the dilution of the chlorin by the presence of nitrogen. It is not necessary that in the producer all the $CO_2$ of the tail gases be reduced to CO, since the presence of $CO_2$ has an accelerating effect on the reaction; by which aluminum chloride is formed from bauxite and carbon; not as much of an accelerating effect as has CO, but still an accelerating effect.

Another advantage afforded by the return tail gases from the reaction chamber to the producer is that, to the extent of such return, the gases coming from the producer and going to the reaction chamber are drier than producer gas formed with air alone. The presence of moisture or hydrogen in the gases in the reaction chamber is detrimental to the yield.

My invention as described may be carried out in several different ways in making aluminum chloride. In producing aluminum chloride from solid carbon and bauxite, which may or may not be briquetted together, the solid materials are heated and are then contacted with chlorin and a certain amount of tail gases from the condensers for aluminum chloride. The tail gases and the chlorin may be sent into the reaction chamber simultaneously or successively. If the usual pause or induction period occurs, it is short. As soon as aluminum chloride vapor begin to be formed, chlorin can be sent in as fast as it is absorbed. A more rapid operation and a better heat utilization is obtained by sending in the tail gases with the chlorin, not only at the beginning of the operation but thereafter, either continuously or intermittently. Oxids of carbon from other sources may be used; but the tail gases I find to work better; partly because they are dry and partly, probably, for other reasons. The action of the tail gases is improved by reheating them so that they may contribute their quota to the heat units required in the reaction chamber. They may be both reheated and reduced by being sent through a gas producer. In methods employing producer gas in conjunction with chlorin for forming aluminum chloride from bauxite, the tail gases are added as a component of the blast of the gas producer; or, with a blow-and-run gas producer, as the blast during the run period. I regard my invention as covering any method of facilitating and accelerating the manufacture of aluminum chloride with the aid of carbon and chlorin wherein the atmosphere in the reaction chamber is artificially enriched in carbon oxids; where there is a concentration of carbon oxids in such atmosphere greater than would other be present.

The invention is also applicable to methods of making aluminum chloride where materials capable of exothermic reaction with chlorin, such as aluminum itself, are admixed with the bauxite. Such additions are useful in supplying the number of heat units necessary for forming aluminum chloride, but they do not speed the reaction between the bauxite or aluminum oxid and the carbon. Better results in the use of aluminum dross and other materials containing aluminum oxid, in addition to reduced aluminum (sulfite, etc.), are obtained in the presence of carbon oxids, than in their absence.

Some measure of the advantages of this invention may be secured by the simple expedient of using a little air with the chlorin in the reaction chamber, thereby, so to speak, forming carbon oxids in place at the expense of some of the carbon of the charge; but this has the disadvantage of introducing also some atmospheric moisture.

What I claim is:—

1. In the manufacture of aluminum chloride from bauxite and other forms of alumina with the aid of chlorin, the process which comprises employing in conjunction with the chlorin some of the waste gases of the operation itself, such gases being reduced and heated by passage through incandescent carbon prior to mixture with the chlorin.

2. In the manufacture of aluminum chloride vapors from alumina, carbon and chlorin in a suitable reaction chamber, the process which comprises collecting the vapors and gases formed in the reaction, cooling to condense aluminum chloride and returning a portion of the uncondensed gases to the reaction chamber via a gas producer.

3. In the manufacture of aluminum chloride from alumina and chlorin in the presence of a reducing agent, the process which comprises cooling the effluent mixture of gases and vapors to condense aluminum chloride therefrom, reducing a portion of the residual gases in a gas producer and returning the reduced gases to the reaction zone to accelerate the action of the chlorin upon the alumina.

4. In the manufacture of aluminum chloride from solid carbon and oxidized forms of aluminum with the aid of a flow of chlorin passing thereover, the process which comprises shortening the period of induction in the production of aluminum chloride by first contacting with the solid materials a mixture of chlorin and gas containing an oxid of carbon and thereafter continuing the operation with gas containing an increased proportion of chlorin.

5. In the manufacture of aluminum chloride from solid carbon and oxidized forms of aluminum with the aid of a flow of chlorin passing thereover, the process which comprises shortening the period of induction in the production of aluminum chloride by first contacting with the solid materials a mixture of chlorin and gas containing an oxid of carbon and thereafter continuing the operation with gas containing an increased proportion of chlorin, some proportion of gas containing oxid of carbon being however added to the chlorin in the later periods of flow.

6. In the manufacture of aluminum chloride from a heated mixture of bauxite and carbon with a flow of chlorin, the process of accelerating the production of aluminum chloride which comprises diluting the chlorin in the first stages of operation with returned gases coming from the aluminum chloride condensers and thereafter continuing the operation with gas which is mainly or wholly chlorin.

In testimony whereof, I have hereunto affixed my signature.

ALMER M. McAFEE.